H. E. MURRAY.
Carriage Seat Clamp.

No. 77,309.

Patented April 28, 1868.

Witnesses
H. C. Ashketter
Wm A. Morgan

Inventor
H. E. Murray
per Murray
Attorneys

United States Patent Office.

H. E. MURRAY, OF CHESTER, NEW YORK.

Letters Patent No. 77,309, dated April 28, 1868.

IMPROVED CLAMP FOR VEHICLE-SEATS.

*The Schedule referred to in these Letters Patent and making part of the same.*

TO ALL WHOM IT MAY CONCERN:

Be it known that I, H. E. MURRAY, of Chester, in the county of Orange, and State of New York, have invented a new and useful Improvement in Clamps for Vehicle-Seats; and I do hereby declare that the following is a full, clear, and exact description thereof, which will enable others skilled in the art to make and use the same, reference being had to the accompanying drawings forming part of this specification, in which—

Similar letters of reference indicate like parts.

The object of this invention is to provide a superior clamping-device for the movable seats of vehicles.

It consists of the clamp-link H, having a foot-catch, I, and ring J, which catches upon the hook K, which latter is affixed to the lever B by means of the reduced end, e, of the hook passing through a rubber spring, Q, held in the hollow head a, forming part of the said lever B. The reduced end e is prevented from drawing downward through the rubber spring, by means of a screw-washer, d, or other suitable device. The lever B is pivoted to the upper part of the plate C by a pivot-stud, g, and the said plate is screwed to the end-board M of the seat L, as shown at f. The said plate C has a rack-extension, D, and guard-rod, G, for the purpose of receiving the nib of the pawl E, which is pivoted in a recess, j, by a pivot, h, as shown.

Figure 1:
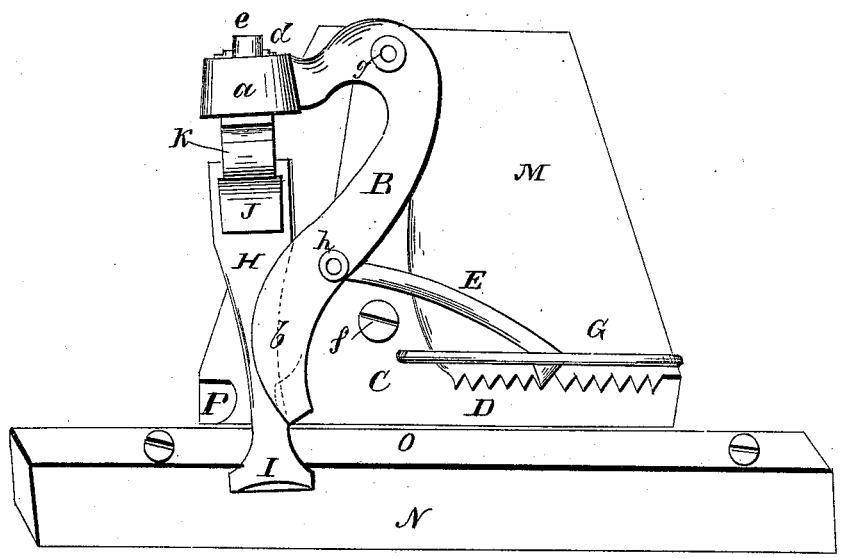
Figure 1 is a side view of my improved clamp.
Figure 2:
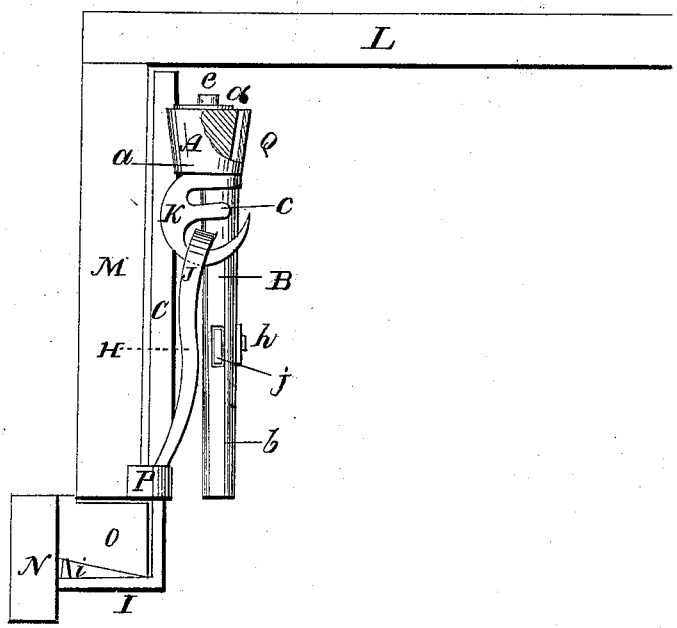
Figure 2 is an end view of the same.

The end-boards, M, of any ordinary seat usually slide on strips O, affixed on the inner side of the wagon or carriage-body, and the foot-catch I of the clamp-link H reaches under this said strip, as shown at fig. 2.

The lever B, being actuated forward, draws the foot-catch firmly to the under side of the strip, and the seat is thus clamped firmly by the action of the pawl and clamp-link.

The lower part of the plate C is formed with a notch, for the purpose of receiving the clamp-link and aiding to hold it firmly.

The metal adjacent to one side of this notch is shown at P, the said notch being shown wider than it would be in practice, for the purpose of showing its position.

The lever B passes to a position in front of and against the link H when the seat is clamped, and thus conduces to hold the link immovable.

The rubber spring provides a yielding quality to the clamp, to enable the lever to be actuated forward until the clamp is drawn to a firm bearing.

A projection or tooth, i, is cast upon the foot-catch, to prevent the latter from slipping on the strip O. A projection, c, is formed in the hook K, as shown, for the purpose of hooking thereon the ring J, where the strip O is unusually wide.

The plate, lever, and link are formed of cast metal or malleable iron, and constitute a cheap and convenient clamp, being applicable to the seats of wagons and carriages now in use.

Having thus described my invention, I claim as new, and desire to secure by Letters Patent—

1. The plate C, with its rack-extension D, with its pawl E, the lever B, hook K, and link H, with its foot-catch I, all constructed and operating together, substantially as shown and described, and for the purpose set forth.

2. The rubber spring Q, hollow head a, and hook K, in combination with the link H, lever B, and pawl, all substantially as and for the purpose set forth.

H. E. MURRAY.

Witnesses:
CHARLES H. WESTERVELT,
JESSE ANDREWS.